F. C. HALL.
COTTON CHOPPER.
APPLICATION FILED JUNE 21, 1921.
1,422,051.
Patented July 4, 1922.
2 SHEETS—SHEET 1.
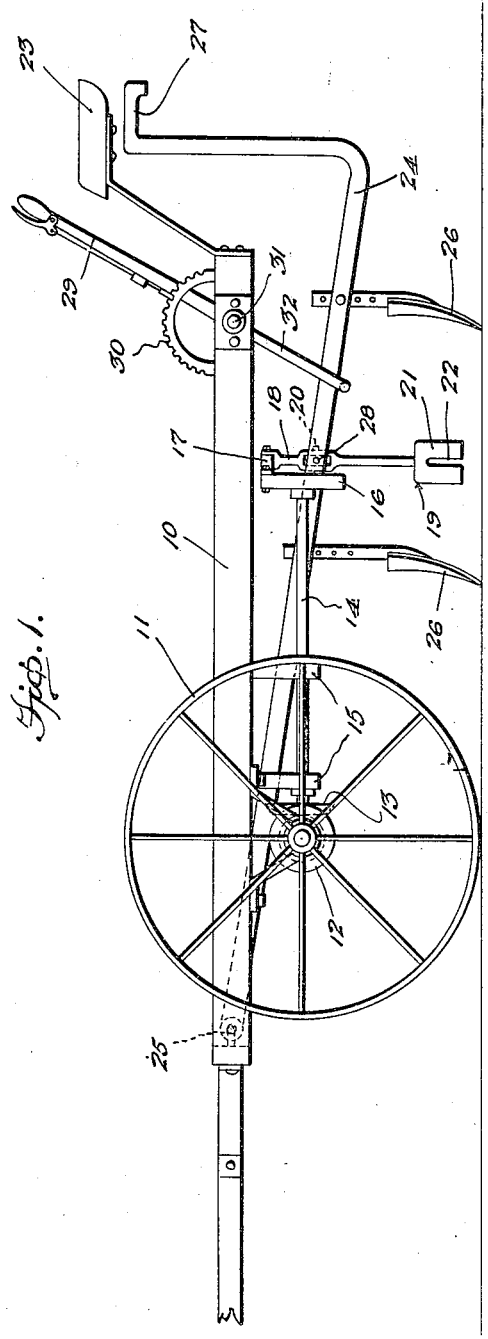
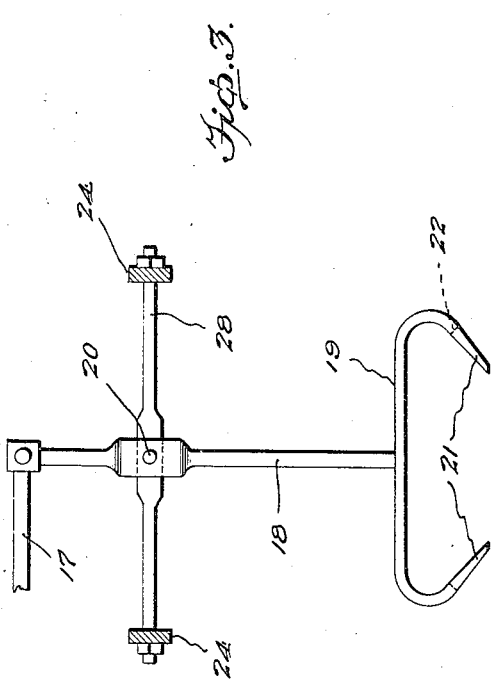
F. C. Hall
INVENTOR
BY Victor J. Evans
ATTORNEY
WITNESS:

F. C. HALL.
COTTON CHOPPER.
APPLICATION FILED JUNE 21, 1921.
1,422,051.
Patented July 4, 1922.
2 SHEETS—SHEET 2.
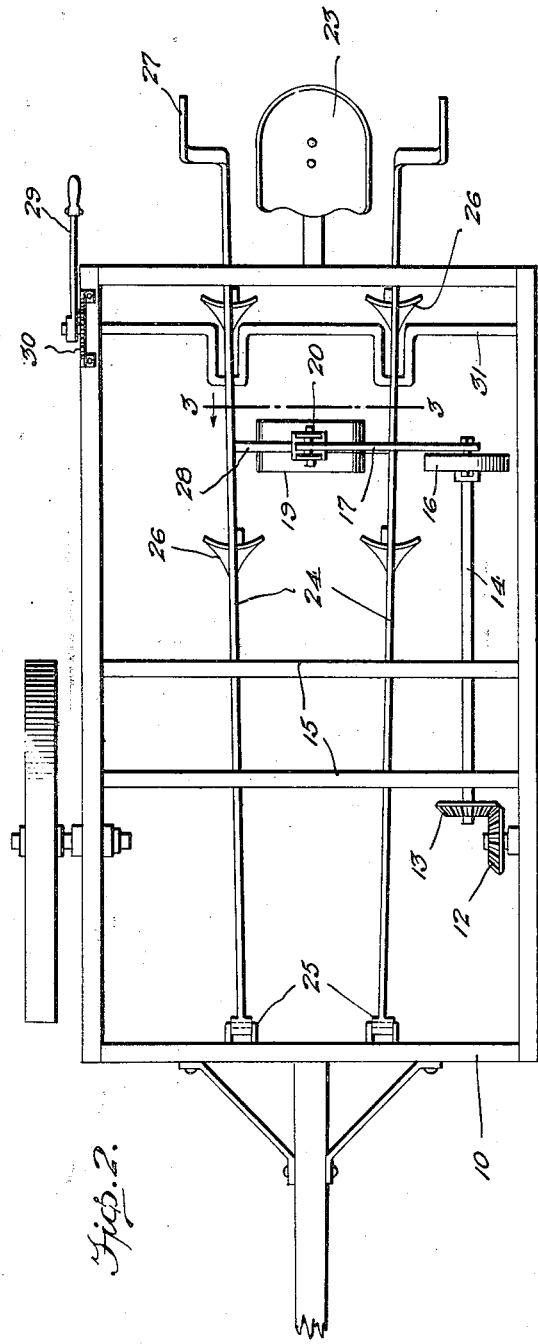
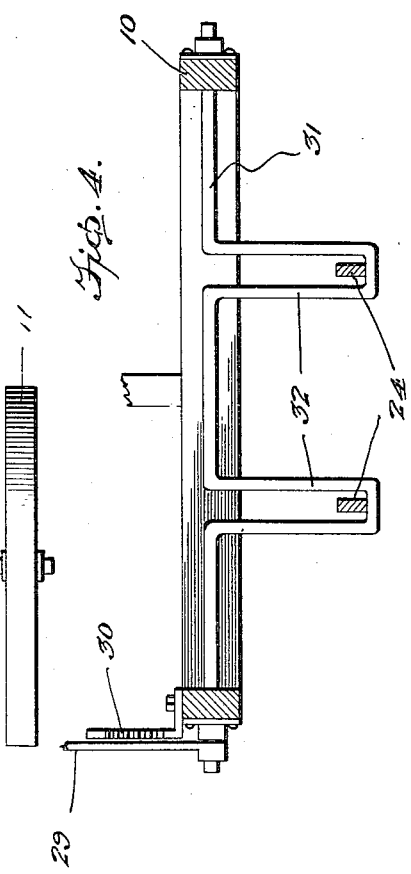
F. C. Hall INVENTOR
BY Victor J. Evans ATTORNEY
WITNESS:

UNITED STATES PATENT OFFICE.

FURNEY C. HALL, OF HARTSFIELD, GEORGIA.

COTTON CHOPPER.

1,422,051. Specification of Letters Patent. Patented July 4, 1922.

Application filed June 21, 1921. Serial No. 479,270.

*To all whom it may concern:*

Be it known that I, FURNEY C. HALL, a citizen of the United States, residing at Hartsfield, in the county of Colquitt and State of Georgia, have invented new and useful Improvements in Cotton Choppers, of which the following is a specification.

This invention relates to a combined cotton chopper and cultivator, contemplating a construction wherein the cultivator beams are mounted for vertical adjustment toward and away from the ground to position the plows to cut a predetermined depth, the cultivator beams being manually adjustable, and provided with means for holding the beams in any given position.

The nature and advantages of the invention will be better understood when the following detailed description is read in connection with the accompanying drawings, the invention residing in the combination, construction, and arrangement of parts as claimed.

In the drawings forming part of this application, like numerals of reference indicate similar parts in the several views and wherein:

Figure 1 is a side elevation of the machine constructed in accordance with my invention.

Figure 2 is a top plan view.

Figure 3 is a transverse sectional view taken on line 3—3 of Figure 2.

Figure 4 is an enlarged fragmentary view showing the method of supporting the cultivator beams in an adjusted position.

The machine forming the subject matter of my invention comprises a main frame 10 supported by ground wheels 11, the frame being substantially of rectangular formation in plan. Carried by the axis of one of the ground wheels is a beveled gear 12 which meshes with a similar gear 13 carried by a horizontally disposed shaft 14, the latter being journaled in the transverse pieces 15 of the frame, whereby motion is transmitted to the shaft 14 from the said ground wheels. The shaft 14 supports an eccentric 16 which is connected with one end of an operating rod 17, this rod being connected to the shank 18 of the hoe 19, the shank 18 being pivoted as at 20. Consequently, when the shaft 14 is rotated, the operating rod 17 is reciprocated to impart oscillatory movement to the hoe 19. The hoe is formed with the oppositely curved extremities 21 which are slotted or bifurcated as at 22. The driver's seat is indicated at 23 and is preferably arranged centrally at the rear of the machine.

The cultivator beams are indicated at 24, and these beams are arranged in spaced parallel relation, having their forward extremities pivoted as at 25 so that the beams can be arranged or lowered to properly position the plows 26 with relation to the ground to cut the desired depth. The plow beams 24 extend longitudinally of the machine and have their opposite ends curved upwardly and outwardly to provide handles 27 arranged at the opposite sides of the driver's seat 23 in convenient reach of the driver, so that the beams can be conveniently raised or lowered as the occasion requires. The beams 24 are connected together by means of a transverse element 28, and it is upon this element 28 that the shank of the hoe is pivoted.

In addition to being raised and lowered by means of the driver, the plow beams may be simultaneously elevated or lowered through the instrumentality of a lever 29, and subsequently held in their adjusted position by means of the pawl and ratchet mechanism 30 associated with the lever. For this purpose, I preferably employ a shaft 31 which is arranged transversely of the machine and mounted for partial rotation, the shaft being formed with crank portions 32 which are disposed immediately beneath the cultivator beams 24. The lever 29 above referred to is carried by the shaft 31 for rotating the latter in the proper direction to either elevate or lower the cultivator beams. It is manifest that when the lever is moved in one direction, and the crank portions 31 moved toward the cultivator beams 24, the crank portions engage said beams to raise the latter away from the ground any desired distance, and when properly positioned with respect to the ground the pawl engages the ratchet on the mechanism 30 so that the beams are held in their given positions. Again, when the lever 29 is moved in an opposite direction to separate the crank portions from the beams 24, the latter gravitate to their lowermost position as will be readily understood.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. A machine of the character described comprising a frame, ground wheels journaled on said frame, a hoe mounted for oscillatory movement, means actuated by one of the ground wheels for controlling the movements of said hoe, cultivator beams pivoted at the forward end of the machine and arranged in spaced parallel relation, the opposite ends of the beams being extended to provide handles whereby the beams can be conveniently raised or lowered, and means including a lever whereby the said beams can be adjusted simultaneously and held in any given position for the purpose specified.

2. A machine of the character described comprising a frame, ground wheels journaled on the frame, a hoe mounted for oscillatory movement, means for operating the hoe and actuated by one of said wheels, spaced parallel cultivator beams pivoted at the forward end of the machine, the opposite ends of the beams being extended to provide handles whereby the beams may be selectively raised or lowered, said hoe being supported by and between said beams, and means including a manually operable lever for simultaneously adjusting said beams toward and away from the ground and holding the beams in a given position.

3. A machine of the character described comprising a frame, ground wheels journaled thereon, a pair of spaced parallel cultivator beams pivoted at the forward end of the frame, said beams being extended to provide handles whereby the beams may be selectively raised or lowered, said hoe being supported by and between said beams, and means including a manually operable lever for simultaneously adjusting said beams toward and away from the ground and holding the beams in a given position.

4. A machine of the character described comprising a frame, ground wheels journaled thereon, a pair of spaced parallel cultivator beams pivoted at the forward end of the frame, said beams being extended to provide handles whereby the beams may be selectively raised or lowered with respect to the ground, a hoe mounted for oscillatory movement, means for operating the hoe incident to the movement of the machine, a transversely disposed shaft mounted for rotation, crank portions formed on the shaft and arranged to engage the underside of said beams whereby the latter may be raised or lowered with respect to the ground, a lever for rotating said shaft, and means for holding the beams in any given position for the purpose specified.

In testimony whereof I affix my signature.

FURNEY C. $\overset{\text{his}}{\times}$ HALL.
mark

Witness:
Louis F. Maire.